United States Patent Office 2,885,372
Patented May 5, 1959

2,885,372

CONTINUOUS PROCESS FOR FOAMING RUBBER LATICES

John Hugh Kelly, Jr., deceased, late of East Los Angeles, Calif., by Mildred M. Kelly, administratrix, Los Angeles, Calif.

No Drawing. Application March 29, 1956
Serial No. 574,585

11 Claims. (Cl. 260—2.5)

This invention relates to natural and synthetic rubbery cellular products and methods for producing same, and is a continuation-in-part of copending application Serial No. 329,918, filed January 6, 1953. The said copending application Serial No. 329,918 is, in turn, a continuation-in-part of Serial No. 64,142, filed December 8, 1948, now abandoned.

Methods for producing natural and synthetic rubbery cellular products in a batch process have been known now for some years. In a batch process a latex dispersion is compounded and frothed in a container. A gelling agent is added at the end of the frothing cycle and the finished froth is then poured into molds. Many adverse factors present themselves in the batch process, aside from the disadvantage of high labor costs. Difficulties in controlling the densities of the rubber, and foam unreliability in the presence of the added gelling agents, prevent a uniform product from being made. Also the unloading of the froth in the container must be completed within several minutes if losses due to gelling are to be eliminated. Thus, the finding of a workable continuous process for the production of foam rubbers has been a major goal of the foam rubber industry.

It is customary in compounding latex dispersions to add all the compounding ingredients except the activator, the one most commonly used being zinc oxide, prior to the foaming step. However, if this procedure is followed, the zinc oxide present would induce premature coagulation during the foaming. Therefore, zinc oxide is added after the foaming step, generally immediately prior to the molding operation.

It is also customary in the industry to add a gelling agent to the latex dispersion after the foaming thereof, generally immediately prior to the molding operation. The gelling agent, such as sodium silicofluoride is added after the foaming of the latex, to prevent coagulation or gelling of the latex, before it is poured into the mold.

The addition of these two ingredients after the latex has been foamed presents the chief obstacle in the way of a truly continuous process. The quantities of zinc oxide and the gelling agent added are highly critical, and delicate and very accurate metering operations must be maintained for the introduction of these agents. Even slight errors give rise to wide fluctuations in coagulation time. If such delicate operations could be eliminated, the problem of finding a continuous process would be solved for what would remain in the process would be chiefly only one conventional foaming step.

The addition of zinc oxide necessarily must be in the fom of an aqueous dispersion, since it is only slightly soluble in water. Thus, a separate mixer for maintaining the zinc oxide in suspension is required. Further, when separately adding the zinc oxide after the foaming step, it is difficult to obtain a satisfactory dispersal of the zinc oxide throughout a latex foam.

The separate addition of the gelling agent after the foaming step creates other difficulties in addition to those already mentioned, the chief difficulty being that localized coagulation tendencies are greatly increased when adding a small stream of gelling agent dispersion or solution to a foamed latex. Intimate mixing of a liquid with a foam is always difficult. Therefore, as soon as even a minute amount of gelling agent contacts a latex dispersion, localized coagulation becomes a serious problem.

The present invention is an outgrowth of the improvements disclosed in Patent No. 2,261,439, issued to J. H. Kelly on November 4, 1941, entitled "Preparation of Cellular Compositions of Rubber or Ruber-like Substances."

In that patent a batch process for the production of foam rubber was taught in which the gelling agent was incorporated into an oil-stabilized emulsion. A compounded latex dispersion was then admixed with the foamed oil-stabilized emulsion and sent to the molds where it gelled and was cured. It was found, however, that the former Kelly process was not capable of being utilized in the production of foam rubber by a continuous process. In attempting to utilize the teachings of this paent in a continuous process for the production of foam rubber, problems of local coagulation, mixing, and unsatisfactory gelling times were encountered.

The present invention is concerned with a method overcoming these process difficulties and primarily with a process for producing foamed rubbery substances by a truly continuous process.

It has been found that if a natural or synthetic latex dispersion has added to it a sufficient amount of a stabilizer such as Emulphor-On (manufacured by General Dyestuff Corporation), a polyoxyethylated fatty alcohol, that the latex dispersion may then be compounded having included therein an activator such as zinc oxide, as well as a gelling agent, such as an ammonia salt or sodium silicofluoride, without coagulation. On the contrary, it is found that the latex dispersion may be stored for long periods of time. This is found to be especially true of compounded synthetic latex dispersions having a gelling agent and an activator incorporated therein.

It has been further found that if a second natural or synthetic latex dispersion, which may or may not be compounded, is added to the first described latex dispersion, the admixture and foaming of the latex dispersions will cause a coagulation to occur which is so closely controllable as to be very suitable for the production of foamed rubbery materials on a continuous basis. It is further found that the problem of local coagulation is virtually eliminated.

Accordingly, it is a major object of the present invention to provide a means for producing rubbery cellular materials by a completely continuous process.

It is another object of this invention to provide a continuous process for the production of natural and synthetic cellular rubbers wherein the separate addition of aqueous dispersions of an activator or coagulant after the foaming step is eliminated.

It is a further object of this invention to provide a pair of foamable latex dispersions which are substantially non-gelling at room temperature and which can be stored for long periods of time in their compounded state, but which, when admixed and foamed, are controllably cogelled so that they may be used in a continuous process for the production of foamed cellular materials.

It is yet another object of the invention to provide a simple and inexpensive method of producing rubbery cellular materials by a continuous process suitable for use by small, as well as large, producers.

It is still another object to provide a continuous process which is simpler to perform and easier to control than former processes, and in which there is much less danger of local coagulation or of the foam breaking during the process. Consequently, there is less wastage, and a more uniform product is obtained.

This invention involves a first step of admixing two separately stable latex dispersions, one of said stable latex dispersions carrying a gelling agent and a stabilizer, a second step of foaming the admixture, a third step of obtaining rapid and controlled gellation of the foamed admixture, and a fourth step of curing to obtain the final cellular rubbery product.

There is no restriction on the type of latices that may be admixed in the invention. Examples of synthetic latices that may be used are the butadiene-styrene latices (GR–S series), the chloroprene latices (the neoprene series), and the butadiene-acrylonitrile latices (Hycar series). Natural latices, from any source, may be used in this invention. These latices are all alkaline, the latex globules in each dispersion being negatively charged.

Such substances as have been named hereinabove, having the general properties and physical characteristics of rubber including natural rubber itself, will be referred to in this specification and the appended claims as "rubbery material or substance; and a so-called foam or cellular product of such rubbery substances is referred to as a "cellular rubber material."

The emulsion polymers, or copolymers, of either a synthetic or natural rubber will be referred to in this specification and appended claims as a "latex" or rubber latex.

A latex to which is added various ingredients, as will be described in detail, will be referred to herein as either a "latex composition" or "dispersion."

In further defining terminology, a stabilizer, as used herein, is any substance which, when added to a latex dispersion, prevents the latex globules from coagulating either by forming a protective coating therearound or in some other way protecting the globules from the action of the gelling or coagulating ions. The stabilizer may thus be a protective colloid, either ionic in nature or non-ionic, but preferably non-ionic, since the nature of the colloidal system is such that ionic materials are much more liable to disturb the colloid and cause coagulation of the colloidal particles. A non-ionic stabilizer found useful, which has been heretofore referred to, is Emulphor-On. Other stabilizers that may be used are gelatin, casein, glue, soaps, and the like, the alkalies such as ammonia, caustic soda, and alkali salts. The term stabilizer is to be distinguished from the natural protein stabilizer found in the natural rubber latex or the small amounts of soap or other protective found in synthetic latices which offer little, if any, protection against a gelling agent.

A gelling agent is a substance that will coagulate a latex. Among those that may be used are the conventional salts of fluosilicic acid, for example, sodium or potassium silicofluoride, and the ammonia salts. Broadly speaking, however, while these salts have been found to be the most advantageous gelling agents, the invention is not restricted to the use of such agents, since the addition of any other substances which lower the pH or which confer polyvalent ions to the stabilized latex dispersion will effect coagulation upon admixture of the two latex dispersions.

As mentioned, while the two latices to be admixed may be similar, the dispersions in which they are carried have different properties. For convenience, the two dispersions will be referred to as types A and B, respectively. The stabilized latex dispersion which carries the gelling agent will be referred to as type A, while the term type B will refer to the latex dispersion which does not carry a gelling agent.

Specifically, type A latex dispersion represents latices in which the coagulating ions are present in such amounts that they will confer coagulating properties upon the latex, if such latex is unprotected against active gelling ions, whether the latex is natural or synthetic, or mixtures thereof. The type A dispersion therefore carries a stabilizer which prevents the gelling agent from coagulating the latex.

Type B latex compositions represent generally unbuffered dispersions, that is, they possess no stabilizing or protective agents to prevent the gelling ion from functioning. If the rubber-like latex is of synthetic origin, it usually contains a small amount of an emulsifying agent, such as soap, which has been added during the polymerization process. If the latex is a natural rubber, it similarly has only a small amount of a protective stabilizing means naturally incorporated therein as a protein substance. These latices, however, offer little or no interference with the gelling tendency of the type A latex composition. In some instances type B latex compositions must be buffered to overcome the action of overreactive type A latex compositions. This can be done by adding small amounts of non-ionizing stabilizers, suitable surface tension depressants, or wetting agents.

The types of rubber or rubber-like polymers that are especially satisfactory for use in making the type B latex compositions include centrifuged natural latices of either a 60% solids content containing small amounts of ammonia, and/or fixed alkali hydroxide, or natural latices having a 70–75% rubber solids content containing a small amount of soap stabilizer.

Alternatively, for the type B latices, certain aqueous dispersions of 2-chloro-1, 3-butadiene polymers, when suitably stabilized, such as for example, neoprene type 571 and neoprene type 601, or the older types of neoprene, such as neoprene 50 are satisfactory.

For type A dispersions, butadiene-styrene co-polymers, when made with certain types of emulsifiers and/or dispersing agents, are particularly usable.

An example of the butadiene-styrene type of co-polymer is given according to the Office of Rubber Research in a communication issued to the trade generally, and dated January 11, 1946. Such co-polymer was identified by the designation No. X–270–5, and is now known as GR–S VIII.

The GR–S VIII latex is a water emulsion of a co-polymer of butadiene and styrene stabilized with synthetic emulsifiers and resin soaps. The specification limits follow:

| | |
|---|---|
| Total solids (butadiene/styrene= 50/50) | 50.0% minimum |
| Total soaps | {2.30 minimum, 2.70 maximum} |
| pH | 9.0 min., 10.50 max. |

A preferred form of this type A latex dispersion is made by using X–270–5 (now GR–S VIII) latex to which has been added a sufficient amount of a gelling agent such as sodium silicofluoride or a highly ammoniated solution of ammonium nitrate suitably stabilized as with Emulphor-On. This mixture of latex with the gelling agent and stabilizer is generally stable and may be stored. When the type A latex dispersion has been suitably prepared, it may then be blended with a type B latex composition to create a mixture having a suitably rapid gelling characteristic. X–270–5 (GR–S VIII) copolymer is used only as an example and it is within the scope of this invention to include other natural and synthetic rubbers or rubber-like dispersions, or mixtures thereof, together with a sufficient amount of dispersed gelling agents and stabilizers as will be shown by means of examples.

At least one of the latex dispersions is compounded prior to admixture. Preferably each latex carries approximately 50% of the total amount of compounding ingredients added. The vulcanizing characteristics imparted to the rubbery product are very satisfactory. However, it is to be understood that one or the other of the latex dispersions could be so stabilized as to carry the entire amount of compounding ingredients.

Examples of the manner in which latices may be compounded with the accelerator, anti-oxidant, sulphur, etc., are set forth in the following table. In the example the co-polymer X–270–5 (now GR–S VIII) and the natural latex have been used for convenience only and it is to be understood that any other suitable synthetic or natural polymers can be substituted therefor.

| | | |
|---|---|---|
| X–270–5 (56.6% solids) | 194.5 | |
| Natural rubber latex (60% solids) | | 175.5 |
| Zinc oxide | 3.00 | 3.00 |
| Sulphur | 2.50 | 2.50 |
| Zinc Dibutyldithiocarbamate | 1.00 | 1.00 |
| Sym. Di-beta-napthyl-para phenylene diamine | | 1.00 |
| | 201.00 | 183.00 |

The compounded synthetic latex, as shown above, and the compounded natural latex are typical examples of the compounded latices of the type A and type B latex dispersions, respectively.

The accelerator, anti-oxidant, sulphur and zinc oxide are preferably dispersed by ball milling in the presence of suitable dispersing agents, many of which are well-known in the art. It is further to be understood that the ingredients and proportions set forth in the above table, as well as the water contents of the compounded latices, are in no way to be taken as restrictive or limiting, but are merely included by way of example.

There are a number of other ingredients that may be added to form the type A and type B latex dispersions of the present invention.

In some instances it may be desirable to employ thickening agents in either or both type A or B latex dispersions. Examples of such substances are locust bean gum or methyl cellulose. When these are employed, the amounts of any stabilizer or surface tension depressants which are to be added will ordinarily be adjusted to compensate for the increase in viscosity resulting from the addition of the thickening agent.

Suitable surface tension depressants may be added when required. The depressant, shown in the examples set forth below, is chosen for convenience and is the one-half sodium sulphate ester of a mixture of lauryl and myristyl alcohols which is obtainable commercially under the trade name "Aquarex D" and is manufactured by E. I. du Pont de Nemours & Company.

The potassium soap, an emulsifying and stabilizing agent, as used in the examples, is the crude commercial product, including free glycerine, obtained by saponifying coconut oil.

The surface tension depressant, non-ionic stabilizer, and the soap named above are shown by way of example, and it is not intended to limit the scope of this invention to these particular materials.

In some instances it is desirable to incorporate small amounts of softening oils to the type A latex dispersions or the type B latex dispersions for the purpose of modifying the characteristics of the finished cellular vulcanized product. Such oils may be added to either the type A or type B latex dispersions. These oils are added in small proportions and are generally a selected grade of paraffinic mineral oils, such as for example, the highly refined hydrocarbon oils, such as crystal oil of approximately SAE 20 grade. The usual amount of oil added varies up to about 15% by weight, based on the weight of the polymers used. The oils may or may not accelerate the gelling action of the mixture to which they are added. The use of these oils in the manufacture of foamed or cellular-like products is well known in the art.

The following examples are given to show the manner in which this invention may be employed as a continuous process for producing cellular rubber-like products. The specific examples show various proportions in which the type A latex dispersions and the type B latex dispersions may be blended to obtain the desired results.

*Example 1*

Type A dispersion:           Parts by weight
  GR–S VIII latex (compounded) _____ 35.0 g. dry.
  $NH_4NO_3$ _____ 3.0 dry.
  Emulphor-ON _____ .5 dry.
  Aquarex D _____ .2 dry.
  $NH_4OH$ (28%) _____ 5.0.
Type B dispersion:
  Natural rubber latex (compounded) __ 215.0 g. dry.
  Water (total for dispersions A and B)__ 220.2.

In using the formulation of Example 1 a synthetic latex GR–S VIII is stabilized by Emulphor-ON, aided by the surface tension depressant Aquarex D, and alkaline ammonium hydroxide, the ammonium nitrate salt acting as the gelling agent. To the synthetic latex dispersion is added a natural latex dispersion, the two latices being thoroughly admixed in a continuous foaming machine, then frothed or foamed, and poured into a mold and cured. The mixture gelled almost instantaneously at 190° F., which is also the vulcanization temperature. An excellent grade of foam rubber was obtained.

The addition of zinc oxide to the type A dispersion by means of the activator in the GR–S VIII compounded latex does not upset the equilibrium of the dispersion, since the latex is sufficiently stabilized against the polyvalent zinc coagulant by the Emulphor-ON. Nor does the ammonium nitrate cause coagulation of the Emulphor-ON stabilized latex dispersion. The type A dispersion is therefore storage-stable.

The addition of the zinc oxide to the type B dispersion does not render it unstable, since upon dilution in water, less than 1% of zinc oxide is present. The presence of such a small amount of zinc oxide in the type B dispersion does not render it unstable while the dispersion is stored awaiting use. Thus, it too is storage-stable. Upon admixture of the two dispersions, the total zinc oxide content is over 1%. This amount is sufficient to impart the desired vulcanizing characteristics to the resultant gelled material.

Thus, it is seen that a truly continuous process for making of cellular materials has been described, the steps consisting of admixing two prepared latices, each of which may be stored awaiting use, foaming the admixed latices, controllably co-gelling the admixture, and curing the cellular gelled product.

Example 1 was changed slightly by the addition to the type A dispersion of .55 g. of Methocel (methyl cellulose), the only difference in result being that the material was somewhat easier to work. The Methocel serves as a thickening agent and non-ionic stabilizer. A similar result was obtained .67 g. of casein was added.

Similar tests using natural rubber latex for the type B dispersion and the amounts above set forth of materials in the type A dispersion, but with different types of synthetic latex have also yielded excellent foam rubber. The synthetics used in these variations of Example 1 were GRS–x–547, GRS–x–619, GRS–x–635, GRS–7 and GRS–5, the specification limits of which follow.

| Type | Formula, Butadiene/Styrene | Total Solids | Soap Stabilizer | pH |
|---|---|---|---|---|
| GR–S | | | | |
| x–547 | 70/30 | 49.5% max | Neo Fat D–242 and Potass. Oleate. | 9.0 min. |
| x–619 | 70/30 | 60.0% min | Potassium Neo Fat K–42+Pot. Oleate. | 9.5–10.5. |
| x–635 | 70/30 | 60–63% | Potassium oleate | 9.0 min. |
| –7 | 80/20 | 60–68% | Fatty acid + Resin soaps. | 9–10.50. |
| –5 | 70/30 | 59.0% | Fatty Acid 1.50–2.00%. | 9.50–11. |

In each instance it was found that excellent results were obtained when following the just described procedure.

Example 2

| Type A dispersion: | Parts by weight |
|---|---|
| GRS-x-619 compounded latex | 107.5 g. dry. |
| NH$_4$NO$_3$ | 3.0 dry. |
| Emulphor-ON | .5 dry. |
| Aquarex D | .2 dry. |
| NH$_4$OH (28%) | 5.0. |
| Type B dispersion: | |
| Natural rubber latex (compounded) | 104.0 g. dry. |
| Water (total for dispersions A and B) | 170.3. |

This example demonstrates the great flexibility of the process, the amounts of the types A and B latex materials being substantially the same, as contrasted with the preceding formula. Here again, it was found that the process could be carried on continuously by simultaneously feeding the latices into a machine which first thoroughly mixed them together, then frothing the mixture, and then discharging it into molds for curing. The rate of gelation is such that no premature gelation or localized coagulation were experienced, and the resulting cured foam was of good consistency and texture.

Example 3

| Type A dispersion: | Parts by weight |
|---|---|
| GRS-x-635 compounded latex | 35.5 g. dry. |
| Emulphor-ON | 0.5 dry. |
| Aquarex D | .2 dry. |
| (NH$_4$)$_2$SO$_4$ | 3.0 dry. |
| NH$_4$OH (28%) | 5.0. |
| Type B dispersion: | |
| Natural rubber latex (compounded) | 217.0 g. dry. |
| Water (total for dispersions A and B) | 188.3. |

This example, made with a different gelling agent, likewise produced an excellent foamed product in a continuous process. Similar results were also obtained when 4.0 g. of (NH$_4$)$_2$CO$_3$ were substituted in place of the (NH$_4$)$_2$SO$_4$. The relative quantities of the latices were then changed, to 50 g. of GRS-x-635 and 150 g. of natural rubber, using the ammonium carbonate in lieu of the sulphate, and total water of 166.3 g., with excellent results still being obtained.

As previously mentioned, other synthetics than those of the GR-S latex dispersions can be used in making foam rubber materials on a continuous process basis. Another such synthetic type that serves very well as the latex in type A dispersions is Hycar OR (butadiene acrylonitrile polymers). The Hycar OR functions very well as a gelling agent carrier to be used with a natural rubber type B dispersion.

Example 4

| Dispersion A: | Parts by weight |
|---|---|
| Hycar OR compounded | 38.0 g. dry. |
| NH$_4$NO$_3$ | 3.0 dry. |
| Emulphor-ON | .5 dry. |
| Aquarex D | .2 dry. |
| NH$_4$OH (28%) | 5.0. |
| Dispersion B: | |
| Natural rubber latex compounded | 209.0 g. dry. |
| Water (total for dispersions A and B) | 216.3. |

The dispersions were mixed, frothed, gelled and cured, as before, with like results, further demonstrating the flexibility of the process for use with various types of latex.

Neoprene (stable alkaline dispersions of polymerized chloroprene in water) can be used as a type B latex in this invention. For example, neoprene latex can be used to form the type B dispersion where Hycar or GR-S latices are used in the type A dispersion, thus giving an all synthetic foam rubber product.

Example 5

| Dispersion A: | Parts by weight |
|---|---|
| Hycar OR latex compounded | 35.2 g. dry. |
| Sodium silicofluoride (first mixed with 20 g. water to form a paste) | 10.0 g. dry. |
| Methocel (5% solution) | 4.0 g. |
| Dispersion B: | |
| Neoprene latex (compounded) | 200.0 g. dry. |
| Glycine, U.S.P | 2.0 g. dry. |
| Water (total for dispersions A and B) | 244.5 g. |

As with the previous examples, the resulting product is a strong excellent foam rubber.

Example 6

| Dispersion A: | Parts by weight |
|---|---|
| GRS-8 latex compounded | 38.0 g. dry. |
| NH$_4$NO$_3$ | 3.0 dry. |
| Emulphor-ON | .5 dry. |
| Aquarex D | .2. |
| NH$_4$OH (28%) | 5.0. |
| Methocel (5% solution) | 4.0. |
| Dispersion B: | |
| Neoprene latex compounded | 216.0 dry. |
| Glycine, U.S.P | 2.0 g. dry. |
| Water (total for dispersions A and B) | 256.5 g. |

There is no limit on the type of latices that may be admixed and foamed in accordance with the principles of this invention. The basic requirement, regardless of whether a GR-S latex in a type A dispersion is admixed with a GR-S latex in a type B dispersion, or whether a natural latex is incorporated in a type A dispersion and admixed with a GRS latex in a type B dispersion, is always that the gelling ions of the zinc oxide and gelling agent shall not effect gelation of the stabilized dispersion in which they are incoroprated, but can initiate gelation of an unprotected or unstabilized latex dispersion, the said gelation causing a co-gelation of the type A dispersion along with the gelation of the type B dispersion.

Example 6 shows a combination of two synthetic latices essentially complemental in the process; that is, one of the latices can be readily stabilized and at the same time carry gelling agents for the latex in the other dispersion, but as mentioned previously, the full benefits of the invention are normally realized by the simpler approach of merely having one dipersion serve as a carrier, as illustrated in the various examples given.

It is also advantageous to carry the gelling agent in the synthetic latex dispersion rather than in the natural latex, since it has been found that the stability of a synthetic latex is much greater than that of a natural latex. Therefore, while the natural latex may be stabilized to the extent that it may carry a gelling agent, the storing qualities of the natural latex dispersion similarly prepared are inferior to those of a stabilized synthetic latex dispersion.

It is to be noted from the foregoing detailed examples that each of the dispersions of type A or type B can be stored for months; however, the period of storage does not affect the gelling time when the latex dispersions are admixed.

The advantages in having a long period of storage are manifest, especially for the small producer who may now order in large quantities.

Few pieces of equipment are necessary for the continuous process described. Two latex storage tanks are required, each connected to a continuous foaming machine. One latex dispersion, for instance, type A is compounded, and may be stored in one tank, while type B, which may also be compounded if desired, is stored in the other, awaiting use. The continuous foaming machine outlet leads to the molds where heat is applied to cure the rubber.

As mentioned previously, no auxiliary mixers for such ingredients as zinc oxide or sodium fluorosilicate are required for they are added and dispersed when the latex dispersion is made. Further, and most important from a cost standpoint, no delicate metering devices are required for these materials.

The smaller producer is especially benefited by the process of the present invention for he requires a minimum amount of equipment, and may have the compounded latex dispersions shipped to him whenever, and in whatever quantities, he wishes.

One continuous foaming machine only is necessary for the continuous process described herein—no pre-frothing of one or the other of the latices being practicable or necessary.

In the detailed examples and according to the principles of the invention, foam collapse due to local coagulation during the continuous foaming process is absent, for the reasons outlined below. The ability with which two latex dispersions may be admixed far surpasses the ease with which an aqueous solution or dispersion of gelling agent may be admixed with a latex dispersion. Further, in past prior art processes, the practice is to add an aqueous solution or dispersion of a gelling agent to an aerated, frothed, or foamed latex dispersion. The admixture of a froth with a liquid is always much more difficult than is the admixture of a liquid with a liquid. The relatively great ease with which the two liquid latex dispersions can be mixed bears a direct relationship to the manner in which the gelling agent may be uniformly dispersed within the admixed latices, the more rapid and uniform the dispersal becomes, the less the possibility of foam collapse due to local coagulation.

Also, the gelling agent, carried by the latex dispersion in accordance with the principles of this invention does not lower the pH of the said dispersion appreciably, whereas the pH of the aqueous dispersion or solution of the gelling agent generally added in the prior art processes has a pH below 7. The admixture of a low pH liquid greatly facilitates the gelling action tending to cause local coagulation as soon as the aqueous gelling dispersion or solution strikes the latex.

From the foregoing detailed examples it is seen that the basic concept of preparing two separately stable dispersions of different types of rubbery latex, with one dispersion having the ability to initiate gelling of the other to thereby gel both, can be practiced with many varieties of latex and with great flexibility in the choice of stabilizers, gelling agents, and methods of handling the materials, and particularly that the process is capable of being practiced on a continuous basis.

What is claimed is:

1. A continuous process for making cellular rubbery material which comprises: forming two separate stable rubber latex dispersions, each dispersion having a latex selected from the group consisting of conjugated-diene and Thiokol rubbers, one of said dispersions carrying a gelling agent selected from the group consisting of alkali fluosilicates, ammonium sulfate, ammonium nitrate, and ammonium carbonate salts, said gelling agent initiating gelling of both dispersions when they are admixed; continuously admixing the two dispersions; immediately and continuously frothing the admixture; and curing the resulting gelled products.

2. A continuous process for producing cellular rubber materials which comprises: preparing a first stable rubber latex dispersion having a latex selected from the group consisting of conjugated-diene and Thiokol rubbers, said dispersion including a stabilizer and a gelling agent selected from the group consisting of alkali fluosilicates, ammonium sulfate, ammonium nitrate, and ammonium carbonate salts, the gelling agent being inert in said latex dispersion; preparing a second storage-rubber latex dispersion having a latex selected from the group consisting of conjugated-diene and Thiokol rubbers, said second latex dispersion being reactive to the gelling agent in said first dispersion, at least one of said latex dispersions being compounded; continuously admixing the two dispersions; immediately and continuously foaming the admixture, cogelling of the foamed admixture resulting at a fixed predetermined time after foaming; and curing the resulting gelled mixture to obtain a cellular rubbery material.

3. A continuous process for producing cellular rubbery materials which comprises: preparing a first compounded stable rubber latex dispersion having a latex selected from the groups consisting of conjugated-diene and Thiokol rubbers, a stabilizer selected from the group consisting of protective colloids and alkalis, and a gelling agent selected from the group consisting of alkali fluosilicates, ammonium sulfate, ammonium nitrate, and ammonium carbonate salts, the gelling agent and the compounding ingredients being present in an amount insufficient to cause coagulation of the latex dispersion, said gelling agent comprising from two to twelve percent of the weight of said latex in said latex dispersion; preparing a second storage-stable rubber latex dispersion having a latex selected from the group consisting of conjugated-diene and Thiokol rubbers; continuously admixing the two dispersions; immediately and continuously foaming the admixture, cogelling of the foamed admixture resulting at a fixed predetermined time after foaming; and curing the resulting gelled mixture to obtain a cellular rubbery material.

4. A continuous process for producing cellular rubbery materials which comprises: preparing a first stable rubber latex dispersion having a latex selected from the group consisting of conjugated-diene and Thiokol rubbers, a gelling agent selected from the group consisting of alkali fluosilicates, ammonium sulfate, ammonium nitrate, and ammonium carbonate salts, at least one stabilizer selected from the group consisting of protective colloids and alkalis, the gelling agent being present in an amount insufficient to cause coagulation, said gelling agent comprising from two to twelve percent of the weight of said latex in said latex dispersion; preparing a second storage-stable rubber latex dispersion having a latex selected from the group consisting of conjugated-diene and Thiokol rubbers, said second latex dispersion being reactive to the gelling agent in said first dispersion to be thereby gelled; continuously admixing the two dispersions; immediately and continuously foaming the admixture, cogelling of the foamed admixture resulting at a fixed predetermined time after foaming; and curing the resulting gelled mixture to obtain a cellular rubbery material.

5. A continuous process for producing cellular rubbery materials which comprises: preparing a first stable compounded latex dispersion having a latex selected from the group consisting of conjugated-diene and Thiokol rubbers, a stabilizer selected from at least one of the group consisting of protective colloids and alkalis, and a gelling agent selected from the group consisting of alkali fluosilicate salts, ammonium sulfate, ammonium nitrate, and ammonium carbonate salts, said gelling agent being present in an amount insufficient to cause coagulation of the stabilized latex, said gelling agent comprising from two to twelve percent of the weight of said latex in said latex dispersion; preparing a second storage-stable rubber latex dispersion having a latex selected from the group consisting of conjugated-diene and Thiokol rubbers, said second latex dispersion being reactive to the gelling agent in said first latex dispersion to be thereby gelled; continuously admixing the two dispersions; immediately and continuously foaming the admixture, cogelling of the foamed admixture resulting at a fixed predetermined time after said admixture and foaming; and curing the resulting gelled mixture to obtain a cellular rubbery material.

6. A continuous process for producing cellular rubbery materials which comprises: preparing a first compounded stable rubber latex dispersion having a latex from the group consisting of conjugated-diene and Thiokol rubbers, at least one stabilizer selected from the group consisting of protective colloids and alkalis, and a gelling agent selected from the group consisting of alkali fluosilicates, ammonium sulfate, ammonium nitrate and ammonium carbonate salts, the gelling agent and the compounding ingredients being present in an amount insufficient to cause coagulation of said first dispersion, said gelling agent comprising from two to twelve percent of the weight of said latex in said first latex dispersion; preparing a second storage-stable rubber latex dispersion having a latex selected from the group consisting of conjugated-diene and Thiokol rubbers, said second latex dispersion being reactive to the gelling agent in said first dispersion to be thereby gelled; continuously admixing the two dispersions; immediately and continuously foaming the admixture, cogelling of the foamed admixture resulting at a fixed predetermined time after foaming; and curing the resulting gelled mixture to obtain a cellular rubbery material.

7. A continuous process for producing cellular rubbery materials which comprises: preparing a first compounded stable rubber latex dispersion having a latex selected from the group consisting of conjugated-diene and Thiokol rubbers, at least one stabilizer selected from the group consisting of protective colloids and alkalis, and a gelling agent selected from the group consisting of alkali fluosilicates, ammonium sulfate, ammonium nitrate and ammonium carbonate salts, the gelling agent and the compounding ingredients being present in an amount insufficient to cause coagulation of said first latex dispersion, said gelling agent comprising from two to twelve percent of the weight of said latex in said first latex dispersion; preparing a second storage-stable rubber latex dispersion having a latex selected from the group consisting of conjugated-diene and Thiokol rubbers, said latex dispersion being reactive to the gelling agent in said first latex dispersion to be thereby gelled; continuously admixing the two dispersions; immediately and continuously foaming the admixture, cogelling of the foamed admixture resulting at a fixed predetermined time after foaming; and curing the resulting gelled mixture to obtain a cellular rubbery material.

8. A continuous process for producing cellular rubbery materials which comprises: preparing a first compounded stable rubber latex dispersion having a latex selected from the group consisting of conjugated-diene and Thiokol rubbers, a non-ionic stabilizer, and a gelling agent selected from the group consisting of alkali fluosilicates, ammonium sulfate, ammonium nitrate and ammonium carbonate salts, the gelling agent and the compounding ingredients being present in an amount insufficient to cause coagulation of said first latex dispersion, the gelling agent comprising from two to twelve percent of the weight of said latex in said latex dispersion; preparing a second-storage rubber latex dispersion having a latex selected from the group consisting of conjugated-diene and Thiokol rubbers, said latex dispersion being reactive to the gelling agent in said first dispersion to be thereby gelled; continuously admixing the two dispersions; immediately and continuously foaming the admixture, cogelling of the foamed admixture resulting at a fixed predetermined time after foaming; and curing the resulting gelled mixture to obtain a cellular rubbery material.

9. A continuous process of making cellular rubbery materials which includes the steps of: preparing a first stabilized rubber latex dispersion having a latex selected from the group consisting of conjugated-diene and Thiokol rubbers, a polyoxyethylated fatty alcohol, and a gelling agent selected from the group consisting of alkali fluosilicates, ammonium sulfate, ammonium nitrate, and ammonium carbonate salts, said first latex dispersion remaining ungelled on storing; preparing a second storage-stable rubber latex dispersion having a latex selected from the group consisting of conjugated-diene and Thiokol rubbers; first mixing and then frothing said latex dispersion to thereby cause gelling thereof; and curing the resulting gelled material.

10. The process of making a cellular rubbery material which includes the steps of: preparing a first stabilized compounded rubber latex dispersion having a latex selected from the group consisting of conjugated-diene and Thiokol rubbers, a non-ionic stabilizer, and a gelling agent selected from the group consisting of alkali fluosilicates, ammonium sulfate, ammonium nitrate and ammonium carbonate salts, said latex dispersion remaining ungelled upon storing; preparing a second rubber latex dispersion having a latex selected from the group consisting of conjugated-diene and Thiokol rubbers, said second latex dispersion remaining ungelled upon storing, said first latex dispersion having approximately 15% to 100% as much latex solids by weight as the solids content of said second stable latex dispersion; continuously admixing the two dispersions; immediately and continuously foaming the admixture, cogelling of the foamed admixture resulting at a fixed predetermined time after foaming; and curing the resulting gelled mixture to obtain a cellular rubbery material.

11. The process of making a cellular rubbery material which includes the steps of: preparing a first stabilized alkaline compounded rubber latex dispersion having a latex selected from the group consisting of conjugated-diene and Thiokol rubbers, a non-ionic stabilizer comprising from 0.5% to 2% of the weight of said latex in said latex dispersion, and a gelling agent selected from the group consisting of alkali fluosilicates, ammonium sulfate, ammonium nitrate, and ammonium carbonate salts, said gelling agent comprising from two to twelve percent of said latex in said latex dispersion; preparing an alkaline second compounded rubber latex dispersion having a latex selected from the group consisting of conjugated-diene and Thiokol rubbers, said second latex dispersion remaining ungelled upon storing, said first latex dispersion having approximately 15% to 100% of latex solids by weight as the latex solid content of said second stable latex dispersion; continuously admixing the two dispersions; immediately and continuously foaming the admixture, cogelling of the foamed admixture resulting at a fixed predetermined time after foaming; and curing the resulting gelled mixture to obtain a cellular rubbery material.

References Cited in the file of this patent

UNITED STATES PATENTS

| | | |
|---|---|---|
| 1,852,447 | Chapman | Apr. 5, 1932 |
| 2,261,439 | Kelly | Nov. 4, 1941 |
| 2,529,885 | Sears | Nov. 14, 1950 |
| 2,567,950 | Stoffer | Sept. 18, 1951 |
| 2,609,347 | Wilson | Sept. 2, 1952 |
| 2,649,287 | McChesney | Aug. 18, 1953 |
| 2,659,703 | Toulmin et al. | Nov. 17, 1953 |
| 2,673,723 | Keen | Mar. 30, 1954 |
| 2,706,108 | Miner | Apr. 12, 1955 |

UNITED STATES PATENT OFFICE

CERTIFICATE OF CORRECTION

Patent No. 2,885,372                                                              May 5, 1959

John Hugh Kelly, Jr., deceased

It is hereby certified that error appears in the printed specification of the above numbered patent requiring correction and that the said Letters Patent should read as corrected below.

Column 9, line 62, for "products" read -- product --.

Signed and sealed this 1st day of September 1959.

(SEAL)

Attest:

KARL H. AXLINE
Attesting Officer

ROBERT C. WATSON
Commissioner of Patents